United States Patent [19]

Clark

[11] 4,061,574
[45] Dec. 6, 1977

[54] ASSEMBLY OF PERMEABLE HOLLOW FIBERS AND A TUBESHEET SUPPORTABLE AT ITS FACE AND OPENED BY BORES PARALLEL THERETO

[75] Inventor: George B. Clark, Clayton, Calif.

[73] Assignee: The Dow Chemical Company, Midland, Mich.

[21] Appl. No.: 768,524

[22] Filed: Feb. 14, 1977

[51] Int. Cl.$^2$ ..................... B01D 13/00; B01D 31/00
[52] U.S. Cl. ............................. 210/321 R; 55/158; 210/433 M
[58] Field of Search ............. 55/16, 158; 210/22, 210/23 H, 321 R, 321 B, 321, 433 M

[56] References Cited

U.S. PATENT DOCUMENTS

| 3,422,008 | 1/1969 | McLain | 55/158 X |
| 3,660,281 | 5/1972 | Tober | 210/23 H |
| 3,703,962 | 11/1972 | Schrader | 210/321 R |
| 3,708,071 | 1/1973 | Crowley | 210/321 B |
| 3,794,468 | 2/1974 | Leonard | 55/158 X |

Primary Examiner—Frank A. Spear, Jr.
Assistant Examiner—Richard W. Burks
Attorney, Agent, or Firm—Robert R. Stringham

[57] ABSTRACT

A two-ended bundle of permeable hollow fibers has a first end potted in a resinous tubesheet which is opened for permeate egress by means of a plurality of bores which are generally parallel to the tubesheet face and connect with an axial conduit or with a peripheral, annular conduit. The face of the tubesheet which, optionally, may be opened, is supported by the end of the casing in which the assembly is enclosed when in use as a component of a permeability separatory apparatus. If the second end of the bundle is potted, it is not potted in the same tubesheet as the first end.

10 Claims, 5 Drawing Figures

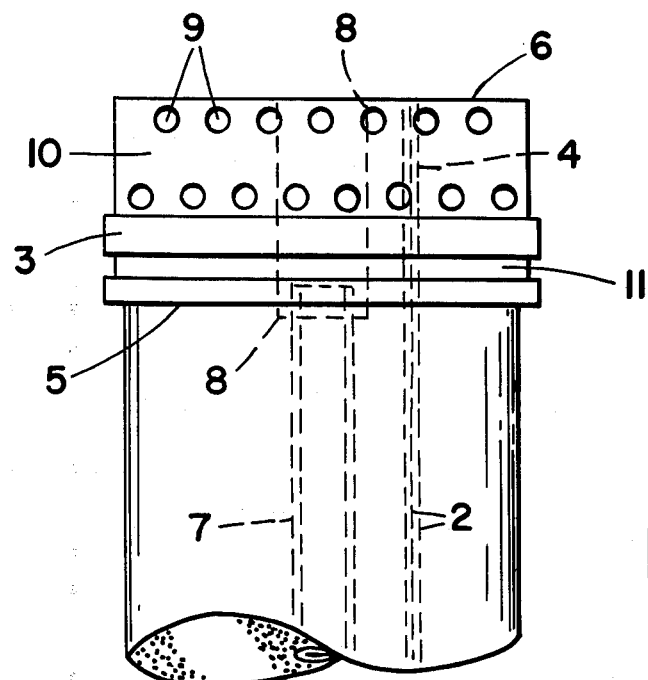
FIG_1A
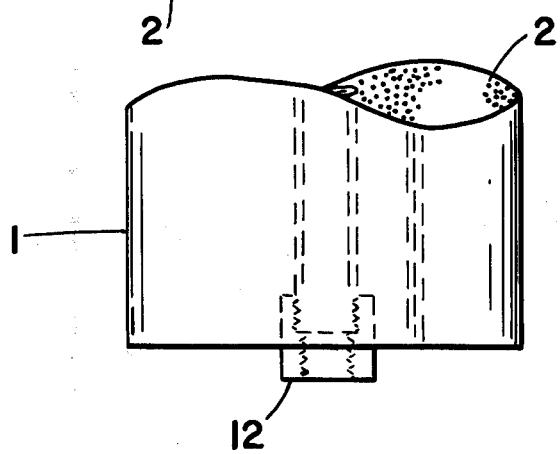
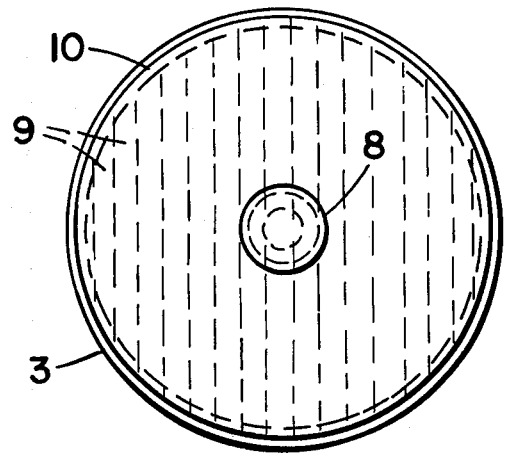
FIG_1B

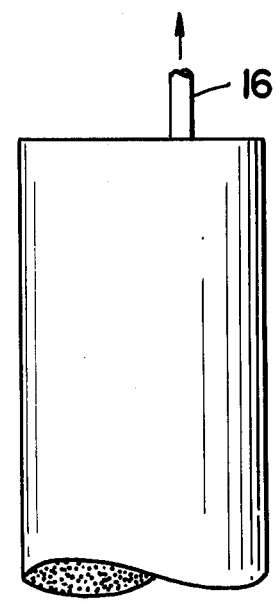
FIG_2A
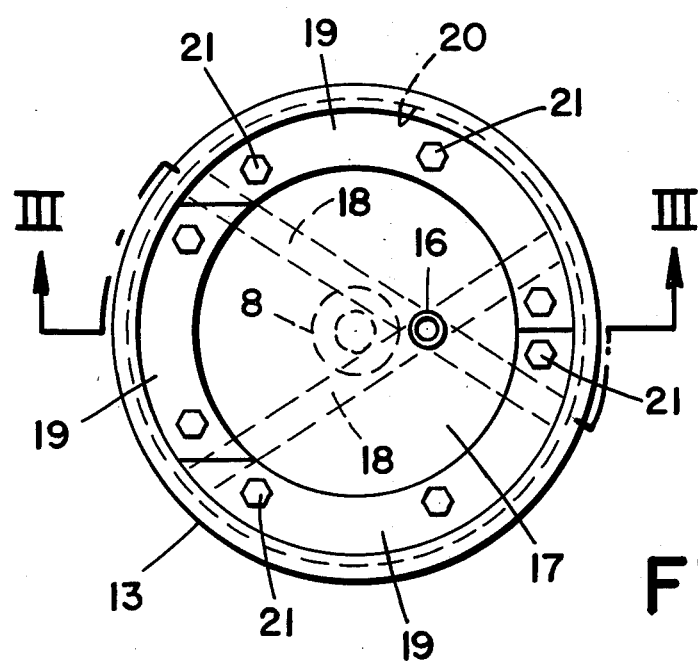
FIG_2B

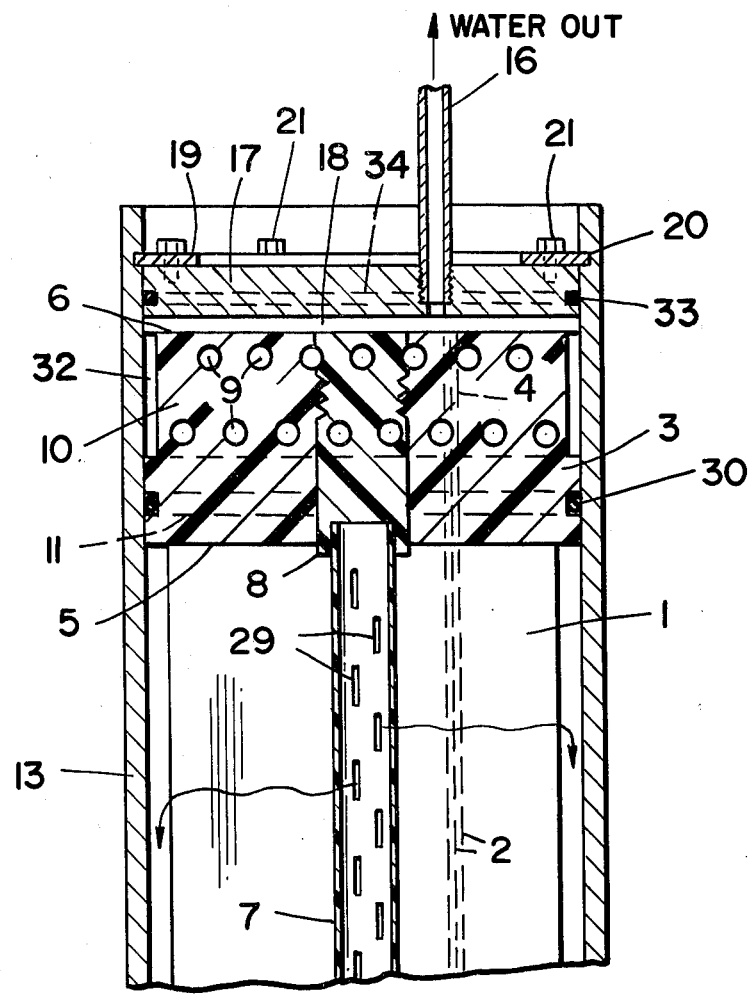
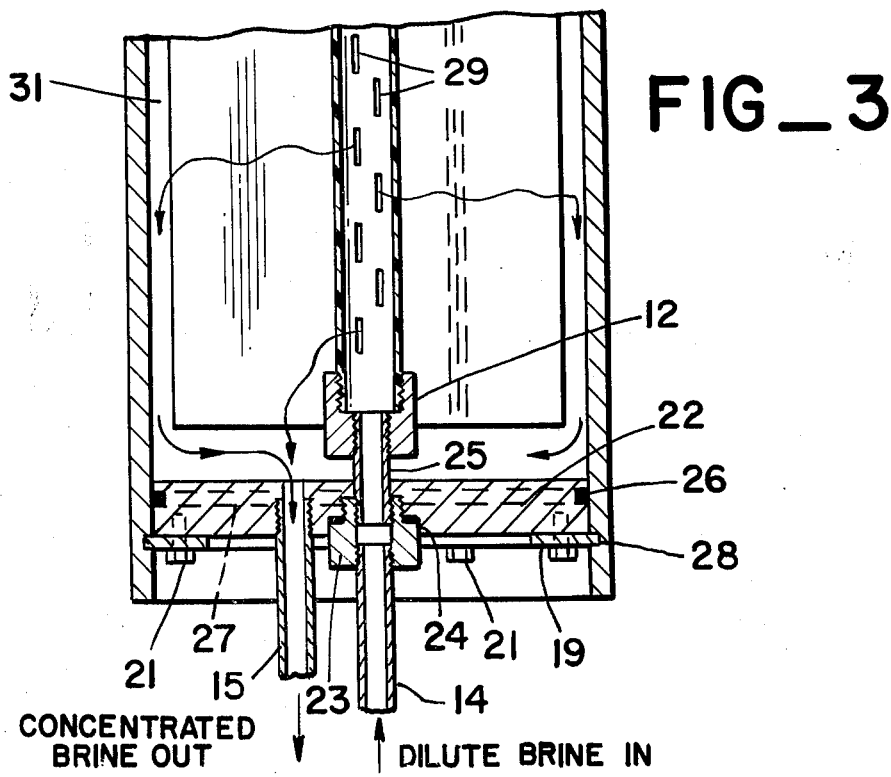
FIG_3

ASSEMBLY OF PERMEABLE HOLLOW FIBERS AND A TUBESHEET SUPPORTABLE AT ITS FACE AND OPENED BY BORES PARALLEL THERETO

BACKGROUND OF THE INVENTION

Permeability separatory devices in which the membrane takes the form of permeable hollow fibers are now well known. Such devices offer a high membrane area per unit volume of module and do not require membrane supporting means, even when trans-membrane pressure differentials of up to 1500 pounds per square inch are employed. However, such units have not been free of support-connected problems.

It is conventional practice to pot the ends of the hollow fibers in a solid body of resin which is conveniently referred to as a tubesheet. The face of the tubesheet is sliced off (or protruding fiber loops are cut off) to permit egress of permeate (water, for example) from the fiber lumens when the fiber/tubesheet assembly is placed, together with suitable sealing means, in a pressurizeable casing and a fluid (an aqueous brine, for example) is supplied to the exterior of the unpotted fiber portions under sufficient pressure to cause permeation through the fiber walls. The pressure differential, between the back of the tubesheet — from which the unpotted fiber portions extend — and the tubesheet face, exerts a force which can be very substantial (as in reverse osmosis processes, for example). This force tends to deform the tubesheet and results in shear stresses which can lead to failure. Thus, some means of supporting the tubesheet is generally required, even at the expense of increased resistance to permeate egress from the fiber lumens.

Perhaps the simplest prior art tubesheet support means is a perforated metal plate as disclosed in U.S. Pat. No. 3,422,008.

An alternative support means has been disclosed (for tubesheets not located at the ends of fiber bundles) in U.S. Pat. Nos. 3,455,460 and 3,475,331. The '460 patent is directed to a type of permeator in which the hollow fibers are spirally wound, in layers, around an inner, elongated core and the tubesheet is disposed longitudinally, like a dike, rising from the core to the bundle periphery and extending from one end to the other of the bundle. The fibers passing through the tubesheet are opened by routing out a trench (into which a porous support member is inserted) or by drilling holes (which may or may not penetrate the core wall). The '331 patent discloses a spherically wound hollow fiber bundle with an equatorial tubesheet (dike) which is drilled or routed to open the fiber lumens.

Although the latter two patents issued in 1969, it does not appear to have been recognized that drilling could also be applied to end-potted bundles, thereby permitting the tubesheet to be supported simply by placing it with its face against the casing end, while avoiding any restriction of permeate egress from the fiber lumens. The only other type of support means which has been disclosed, to the best of the present applicant's knowledge, is that described in a patent (U.S. Pat. No. 3,702,658) filed after the aforesaid patents issued.

The latter patent is directed to the disposition of "porous" supports, such as particle beds, frits and screens, between the tubesheet face and the casing end. Less impedance to permeate flow, as compared to perforated plates, is said to result if certain relationships between the fiber lumen diameter and the characterizing surface dimensions of the supporting material are satisfied. However, even when an optimum match between lumen size and surface character is achieved, this type of support still, unavoidably, interferes to a substantial extent with egress of permeate from the fiber ends.

OBJECTS OF THE INVENTION

The primary object of the present invention is to provide a method of supporting tubesheets, disposed at the ends of hollow fiber bundles, which does not interfere with the free flow of fluids into or out of the fiber lumens.

A further object is to eliminate the need for a porous supporting member between the tubesheet face and the casing end.

Yet another object is to provide a method of support to which already-fabricated permeator modules, in which the tubesheets are supported only by annular rings or similar means, can readily be adapted.

Additional objects will be made apparent to those skilled in the art by the disclosures herein.

SUMMARY OF THE INVENTION

The accompanying drawings will be briefly described.

FIG. 1A is a plan view of a generally cylindrical, end-potted, hollow fiber bundle. As shown, the unpotted fiber ends are closed, the potted ends have been opened by drilling bores into the tubesheet, the diameter of the tubesheet has been reduced for a distance back from the (low pressure) face to provide a permeate collecting space, and a groove has been machined in the tubesheet periphery to accommodate an O-ring seal.

FIG. 1B is an end view of the assembly.

FIG. 2A is a general view of a completely assembled permeator unit comprising a fiber bundle/tubesheet assembly of the type shown in FIG. 1.

FIG. 2B is an end view of the permeator and

FIG. 3 is an elevational view of half of the (longitudinally sectioned) permeator.

The present invention, in its broadest aspect, is a non-random bundle of permeable hollow fiber lengths, the bundle having two recognizeable ends, at least one of which is potted in a tubesheet body in which the other end is not potted and which is pierced by bores which are generally perpendicular to the central, "longitudinal" axis of the bundle, the bundle/tubesheet assembly being adaptable to use as a component of a hollow-fiber permeability separatory device.

More precisely, the invention may be defined as a hollow fiber and tubesheet assembly having utility as a component of a permeability separation apparatus and comprising a non-random fiber bundle having two ends, one of which is potted in a shaped, solid resin body which constitutes said tubesheet and is the only end of said bundle potted therein, said bundle consisting of permeable, hollow fiber lengths, said tubesheet having a first face, from which the unpotted portions of said fiber lengths depend, and a second, opposed face, the portions of the fiber lengths potted in said tubesheet extending therethrough from said first face and terminating at or adjacent to said second face, at least half of said potted fiber portions being interrupted by and opening into bores in the tubesheet, each of which extends to and opens upon a surface of said tubesheet other than said first and second faces, said assembly being adapted to be disposed, together with cooperating sealing and permeable collecting means, in a pressurizeable casing fitted with appropriately located feed fluid ingress and egress means and with permeate egress means, in such manner that:
  a. when fluid is supplied under pressure to the exterior surfaces of the unpotted fiber portions, it will permeate through the fiber walls, pass through the fiber lumen and said bores to said permeate collecting means and out through said permeate egress means;
  b. said assembly is positioned in said casing with said second face in contact with at least a major portion of an end member thereof so that the tubesheet is supported against the pressure exerted by said fluid on said first face, and
  c. egress of permeate from the fiber lumens is not interfered with by said contact.

Ordinarily, the bores in the tubesheet will open on a peripheral surface from which they were drilled, although it is possible to fabricate units in such manner that the bores open only on an internal "peripheral" surface, i.e., at the interior of a hollow axial core which is contiguous with the tubesheet and may be considered, in this regard, as part of it.

The fiber "lengths" are either separate, unlooped fiber sections or generally elongate loops of one or more fibers or tows and may be disposed in the bundle in essentially parallel array or as spirals or criss-crossed end-to-end loops (around a central core or mandrel).

It should be noted that a fiber bundle and tubesheet assembly which is adapted to be positioned with the tubesheet face in contact with a casing end member is necessarily also adapted to be placed in contact with an intervening support means capable of transmitting the ΔP force to the casing end (or to a support ring sealed in or engaged with the casing wall).

It should also be noted that a second end of a bundle may be potted in a solid body of resin which is not face cut or drilled and functions merely as a positioning, restraining or handling means, rather than as a tubesheet. Alternatively, a second end of a bundle may be potted in a separate tubesheet which may be opened and supported in a conventional manner but preferably is opened and supported in accordance with the present invention.

DETAILED DESCRIPTION

The drawings will now be described in detail. In the embodiment of the invention illustrated in FIG. 1A, a generally cylindrical bundle 1 of parallel hollow fiber lengths 2 (flattened loops, closed at each end) is potted at one end in a tubesheet 3 which is a solid, cylindrical body of a cured resin through which the potted fiber portions 4 (indicated in phantom) extend from inner (or back) face 5 to the outer face 6.

The fiber bundle is disposed symmetrically around an axial core 7 which is hollow, except for a cemented-on solid end portion 8, and is shown mostly in phantom. Slots or holes (not shown) in the walls of the hollow portion of the core constitute a means for introducing a fluid to the exteriors of the unpotted fiber portions. Two spaced apart rows of bores 9, which are parallel to each other and to face 6, pass completely through a tubesheet section (of reduced diameter) having a peripheral surface 10 onto which both ends of each bore open. Those bores which encounter the solid end 8 of core 7 pass on through it without interruption. An annular groove 11 in the larger diameter section of the tubesheet is intended to receive an appropriate elastomeric O-ring seal (not shown). Adaptor 12 threaded onto the small end of core 7 can be connected to a feed fluid source when the fiber bundle/tubesheet assembly is placed in an appropriate casing.

FIG. 1B is an end view of the assembly, as seen from the tubesheet end. The bores 9 and core 7, 8 are seen only in phantom, through the tubesheet face which, in FIG. 1A, is numbered 6.

FIG. 2A is an external view of a completely assembled hollow fiber permeator unit which incorporates the fiber bundle/tubesheet and core assembly of FIG. 1 and is designed for recovery of water from sea water by reverse osmosis. The latter assembly is disposed in a cylindrical casing 13 which is closed by feed and permeate header plates (not shown) set in from the casing ends. The feed header plate is fitted with brine feed and egress conduits (14 and 15, respectively) and the permeate header plate is fitted with a permeate discharge conduit 16.

FIG. 2B is an end view of the assembled permeator, as seen from the end at which permeate is discharged. Permeate header plate 17 has intersecting permeate channels 18, shown in phantom) cut in its inner face, which is in contact with the tubesheet face (not shown). Plate 17 is held in place and supported by segmented ring 19, a peripheral portion in which is seated in an annular groove 20 in the interior surface of casing 13; plate 17 and ring segments 19 are connected by bolts 21. The end of the solid portion 8 of axial core 7, (in FIG. 1) is seen in phantom. The feed header plate is also held in place by and bolted to a segmented retainer ring set in a groove in the interior surface of the casing. The latter elements of the permeator are not shown in FIG. 2 but are essentially identical to ring 19, groove 20 and bolts 21. The tubesheet and header plates are fitted with O-ring seals (not shown) which bear on the interior surface on the casing.

FIG. 3 represents a longitudinal view of the completely assembled permeator of FIG. 2, along section III'III (FIG. 2B). Those elements already numbered in FIGS. 1 and 2 are designated by the same numbers in FIG. 3. Additional elements and their functions are as follows.

Feed header plate 22 is fitted with a threaded-in coupling adaptor 23 which bears against a conventional gasket 24 and connects brine feed conduit 14 with long nipple 25 which is threaded into adaptor 12. An elastomeric O-ring seal 26 is positioned in annular groove 27, (seen in phantom) in plate 22, which is fastened by bolts 21 to segmented supporting ring 19, a peripheral portion of which is seated in annular groove 28 in the inner surface of steel casing 13, the latter being coated inside and out with a brine-resistant epoxy resin (coating not shown). Brine distributing slots 29 in core 7 are arranged in a regular but staggered pattern.

An elastomeric O-ring seal, 30, is disposed in annular groove 11.

The fiber bundle is wrapped with a "bandage" of a suitable fabric, one end of which is embedded in the peripheral portion of the tubesheet and the other end of which is embedded in a thin, annular layer of the same tubesheet material around the periphery of the unpotted end of the fiber bundle. The wrapping functions in a conventional manner to protect the bundle during handling and to constrain it to ensure even brine flow through it. The latter elements are well known in the art and are omitted from the drawings for the sake of clarity.

In operation, untreated brine enters the feed conduit 14 under an appropriate pressure, passes into the core 7 and radially outward through the hollow fiber bundle 1 (and fabric wrap) from slots 29, and thence around the periphery of the bundle through space 31 to the treated brine egress conduit 15. Water permeates through the fiber walls and passes through their lumens to bores 9, then to and through space 32 around the tubesheet 10 periphery to grooves 18 in the inside face of header plate 17 and out through permeate egress conduit 16. O-ring seal 33 is disposed in an annular groove 34 in plate 17 and bears against the inner surface of casing 13.

Materials of construction, fabrication methods and assembly procedures suitable for fiber bundle/tubesheet assemblies of the present invention, and for permeators incorporating the same, are well known or will be made apparent to those skilled in the art by the following brief description.

A typical permeator of the type illustrated in FIGS. 2 and 3 is designed for the production of 2500 gallons per day (GPD) of potable water (about 350 ppm NaCl) from 8333 GPD of sea water (35,000 ppm NaCl) under a transmembrane pressure differential of 800 psig. Approximately two million generally parallel lengths (one million loops) of cellulose triacetate hollow fibers, 35 microns I.D. and 90 microns O.D., constitute the bundle, which is about 7.375 inches in diameter and which has an "active" length (after potting) of about 29.25 inches. The portions of the fibers potted in the tubesheet are about 3.75 inches long and are opened by a total of 15 bores 0.5 inches in diameter. The bundle and tubesheet are built up together on a 33.625 inch long core, consisting of a length of PVC (polyvinyl chloride) pipe and the two PVC adaptors, as it is rotated on spindles connected to said adaptors. A belt of elongated loops of fiber is rolled up on the core in the manner described in U.S. Pat. No. 3,755,034, while an epoxy resin (see U.S. Pat. No. 3,619,459) is continually applied at one end of the growing bundle to form the tubesheet (except for a final peripheral layer). The resin is cured and the bundle/tubesheet/core assembly is spirally wrapped with a DYNEL ® fabric (vinyl chloride/acrylonitrile copolymer) "bandage". A thin layer of tubesheet resin is then applied at each end of the wrapped assembly and cured.

The bores are drilled with a water-lubricated 0.5 inch twist drill while the assembly is locked in an appropriate jig. The assembly is inserted in a 42 inch length of 8 inches, schedule 60, steel pipe which has been coated with a brine resistant epoxy resin, inside and out. The header plates, brine and permeate conduits, segment rings and bolts (all made of brine-resistant stainless steel) and seals, are then emplaced to complete assembly of the permeator.

The fibers employed in the unit described above are prepared essentially in the manner described in U.S. Pat. Nos. 3,423,491 and 3,532,527.

The foregoing example is for purposes of illustration only and a variety of modifications within the ambit of the invention are possible.

Thus, the hollow fiber lengths employed may be fabricated of any of the many different materials listed in a number of U.S. patents and with any of the several different wall structures which are known. They may be gathered together by any method and in any non-random array which constitutes a bundle having two discernible ends, at least one of which can be potted in a solidifiable resin of such nature that bores can be made in the solidified resin (tubesheet), as by drilling or broaching, for example. The bundle may or may not be disposed around a core or mandrel and the fiber lengths may be generally parallel to each other or may crisscross in flat or cylindrical (spiral) layers. It does not matter whether the potted fiber ends are perpendicular to the faces of the tubesheet.

The shape of the outer face may be concave, planar, or convex, since cooperating supporting-member or casing-ends of conformed shape can readily be made. The inner face also does not have to be planar (or concentric with or parallel to the outer face), but a more efficient use of potting resin results if the two faces are parallel and generally perpendicular to the longitudinal axis of the bundle. Accordingly, the latter configuration is preferred.

The permeate egress bores are preferably so located within the tubesheet as to be formable by drilling from an (external) peripheral surface of the same, thus facilitating both fabrication procedures and collection of permeate. However, it is possible to fabricate a fiber bundle, core and tubesheet assembly consisting of two cemented-together halves, the potted fiber portions in each of which have been opened by drilling bores radially outward through the wall of the semi-cylindrical core-half and through the tubesheet-half for a distance somewhat less than a full radius. In order to open a high proportion of the potted fiber ends by radial bores, it is necessary to use a thicker tubesheet and to drill more bores. This type of unit has an advantage in eliminating the need for permeate collecting means, other than a hollow end section of core (separated by a partition from the rest of the bore). However, this advantage is more than counter-balanced by the greater number of fabrication steps required and the reduced efficiency of utilization of materials and space. Accordingly, the latter type of unit, which the bores do not emerge on a peripheral (external) surface of the tubesheet, is distinctly less preferred.

Although the permeate collecting means employed in the embodiment of FIG. 3 (the combination of the annular space around the tubesheet and the cooperating grooves and conduit in the adjacent header plate) is highly satisfactory, an even better arrangement is to groove the outer face of the tubesheet, rather than the inner face of header plate. Since any potted fiber-ends terminating in the portions of the tubesheet removed to make the grooves will be opened, correspondingly fewer bores within the tubesheet will be required and a thinner tubesheet can be used. A convenient way to make such grooves is to first drill a row of bores immediately adjacent the face of the tubesheet and then machine off the face to a depth less than one bore diameter, preferably to a depth of about one bore radius. This will of course result in opening of all fiber-ends terminating at or immediately adjacent to (inside or outside) the tubesheet face and the ungrooved portions of the face will be in contact with the casing end (or intervening support member, porous or non-porous) when the assembly is inserted in a casing, etc. However, this will not matter if the fiber ends not opening into the face grooves do open into the internal bores. It is of course a simple matter to locate the bores in such manner as to ensure this. In order to ensure an adequate area of contact between the ungrooved portion of the tubesheet face and the supporting member against which it will bear, at least half of the fiber ends potted in the tubesheet should be opened by bores, rather than by face grooves. In order to open the potted fiber ends with a minimum number of bores and grooves, the axes of the bores should be parallel to each other and to the axes of the grooves. Also, the grooves and bores should be spaced in a regular, alternating pattern, as viewed from the grooved face. Preferably, not more than a third of the area of the face is grooved; that is, at least two thirds of the fiber ends are opened by the internal bores.

A simpler alternative is to dispense with collecting grooves altogether and to locate one or more permeate egress conduits in the side of the casing to communicate with the annular space around the tubesheet which communicates with the bore ends. If this is done, the area of contact between the tubesheet and the member supporting it will be maximized. Also, in situations where the permeator must be fitted into a relatively short space, the lateral location of the permeate egress conduit(s) may be advantageous.

Still another alternative is to utilize a peripheral surface of the tubesheet in order to drill bores, on a plurality of diameters through the tubesheet and into a hollow axial core end (separated from the rest of the core by a suitable partition or plug) which is to be utilized for permeate egress. The bore openings at the exterior surface are closed by an encircling band (hoop) of metal or resin-impregnated fabric which is cemented or otherwise fastened on (together with cooperating O-ring or other type seals). This is a more practical alternative than joining two half-assemblies which have been bored from the interior of the core-halves. However, radial bores are less efficient in opening the fiber ends than are bores along chords and this embodiment of the invention is not preferred.

When a hollow fiber bundle which does not have any central void (such as a hollow core) is employed, the permeate necessarily must be collected at the ends of the bores opening on the peripheral surface from which they are drilled.

It will be recognized that various sorts of support means, of such design as not to hamper egress of permeate from the bores, may be placed in the annular space between the tubesheet periphery and the casing. However, this ordinarily will not be necessary. It will also be recognized that any of a variety of porous or foraminous support means may be placed in the bores, but the advantages of the invention over conventional tubesheet supporting methods will then not be realized.

Fiber bundle/tubesheet assemblies in which both ends of the bundle are potted in (different) drilled tubesheets are of course within the ambit of the invention. Such assemblies may be utilized in the same manner as the embodiment of FIG. 3, permeate being collected at both ends of the bundle and the treated brine being discharged from conduit means in the side of the casing. Alternatively, the permeate (or ultrafiltrate) derived from the high pressure fluid external to the fibers may be co-mingled with a different fluid fed to the fiber lumens at one tubesheet (under a substantially lower pressure) and discharged at the other tubesheet.

Permeability separation processes which may be carried out with permeator units comprising the fiber bundle/tubesheet assemblies of the invention are not limited to reverse osmosis or to other processes in which all fluid streams consist of liquids; gas/gas and gas/liquid separations are also advantageously carried out with such assemblies. Similarly, they may be employed for such purposes as combining, rather than separating, different fluids.

Still other variations, which will be appparent to those skilled in the art, may be made in such tubesheet/fiber bundle assemblies and in permeator units incorporating them without departing from the essential concept of the present invention—namely, that permeate may be collected from (bores in) a different surface of a supported tubesheet than the face which must be in contact with the support. The embodiments which have been disclosed herein are illustrative only and are not to be construed as limiting the scope of the present invention to an extent inconsistent with the following claims.

What is claimed is:

1. A hollow fiber and tubesheet assembly having utility as a component of a permeability separation apparatus and comprising a non-random fiber bundle having two ends, one of which is potted in a shaped, solid resin body which constitutes said tubesheet and is the only end of said bundle potted therein, said bundle consisting of permeable, hollow fiber lengths, said tubesheet having a first face, from which the unpotted portions of said fiber lengths depend, and a second, opposed face, the portions of the fiber lengths potted in said tubesheet extending therethrough from said first face and terminating at or adjacent to said second face, at least half of said potted fiber portions being interrupted by and opening into bores in the tubesheet, each of which extends to and opens upon a surface of said tubesheet other than said first and second faces, said assembly being adapted to be disposed, together with cooperating sealing and permeate collecting means, in a pressurizeable casing fitted with appropriately located feed fluid ingress and egress means and with permeate egress means, in such manner that:

a. when fluid is supplied under pressure to the exterior surfaces of the unpotted fiber portions, it will permeate through the fiber walls, pass through the fiber lumen and said bores to said permeate collecting means and out through said permeate egress means;

b. said assembly is positioned in said casing with said second face in contact with at least a major portion of an end member thereof so that the tubesheet is supported against the pressure exerted by said fluid on said first face, and c. egress of permeate from the fiber lumens is not interfered with by said contact.

2. A fiber and tubesheet assembly as in claim 1 in which at least half but not all of said potted fiber ends are opened by said bores and essentially all of the fiber ends not so opened are opened by grooves in said second face.

3. A fiber and tubesheet assembly as in claim 1 in which said bores open on a peripheral surface of the tubesheet.

4. A fiber and tubesheet assembly as in claim 3 wherein the axes of said bores are generally parallel to one another and each of the bores opens at both ends on said peripheral surface.

5. A fiber and tubesheet assembly as in claim 2 in which at least two-thirds of said potted fiber ends are opened by said bores.

6. A fiber and tubesheet assembly as in claim 1 which is generally cylindrical in shape and is disposed about an elongated core or mandrel which extends from said second face of said tubesheet, along the central axis of said assembly, to the end of said bundle which is not potted in said tubesheet, the end section of said core or mandrel surrounded by said tubesheet being contiguous therewith and being pierced by at least one of said bores.

7. A fiber and tubesheet assembly as in claim 6 wherein said core is hollow, the section of said core around which the unpotted portions of said fibers are disposed being adapted by openings in its wall for flow of fluid therethrough and the interior of the latter section being separated by a partition or plug within said core from the section thereof which is pierced by said bore.

8. A fiber and tubesheet assembly as in claim 3 in which said tubesheet is of a generally cylindrical shape and said peripheral surface is the surface of an end section of the tubesheet which is proximal to said second face and is smaller in diameter than a section of the tubesheet between said end section and said first face.

9. A fiber and tubesheet assembly as in claim 8 in which the surface of the larger diameter section of the tubesheet is grooved to receive an annular seal.

10. A fiber and tubesheet assembly as in claim 1, disposed with said sealing and permeate collecting means in said pressurizeable casing in said manner.

* * * * *